Patented Feb. 7, 1939

2,146,478

UNITED STATES PATENT OFFICE 2,146,478

PREPARATION OF DERIVATIVES OF β-(p-HYDROXYPHENYL)-ISOPROPYLAMINE

Gustav Hildebrandt, Mannheim, Germany, assignor to E. Bilhuber Inc., Jersey City, N. J.

No Drawing. Application December 23, 1937, Serial No. 181,461. In Germany December 31, 1936

3 Claims. (Cl. 260—574)

This invention relates to the preparation of derivatives of β-(p-hydroxyphenyl)-isopropylamine of the general formula $$HO-C_6H_4-CH_2-CH-CH_3$$
$$|$$
$$Y-N-X$$

In this formula X designates hydrogen, an alkyl radical, for example methyl, ethyl, propyl, isopropyl, butyl, isobutyl, isoamyl etc. or a cycloalkyl radical, for example cyclohexyl, o-, m- or p-methyl-cyclohexyl, tetrahydronaphthyl, decahydronaphthyl etc. and Y an alkyl radical containing at least two carbon atoms, for example ethyl, propyl, isopropyl, butyl, isobutyl, isoamyl etc. or a cycloalkyl radical, such as cyclohexyl, o-, m- or p-methyl-cyclohexyl, tetrahydronaphthyl, decahydronaphthyl etc.

It has already been proposed to prepare β-(p-methoxyphenyl)-isopropylmethylamine by treating p-methoxybenzyl-methylketone with agents which yield formic acid and methylamine. The formyl compound of β-(p-methoxyphenyl)-isopropylmethylamine is obtained thereby and is saponified with dilute mineral acids.

According to another proposal β-(p-hydroxyphenyl)-isopropylmethylamine may be obtained from β-(p-methoxyphenyl)-isopropylmethylamine by eliminating the methoxy group with strong acids. The resulting β-(p-hydroxyphenyl)-isopropylmethylamine is stated according to this known proposal to be physiologically active and to exert actions similar to those of ephedrine.

According to the process of U. S. A. patent application Serial No. 144,547 β-(p-hydroxyphenyl)-isopropylmethylamine is prepared by condensing p-hydroxybenzylmethylketone with ammonia and simultaneously or thereafter reducing the condensation product and methylating the reduced product at the nitrogen atom in a manner known per se.

According to this invention it has been found that the favourable therapeutic properties of β-(p-hydroxyphenyl)-isopropylmethylamine are not limited to this substance alone but that substances of the like favourable therapeutic properties may be obtained by condensing p-hydroxybenzyl-methylketone with ammonia and simultaneously or thereafter reducing the condensation product whereafter the resulting base is treated with alkylating or cyclo-alkylating agents. In the preparation of the products of this invention of the general formula $$HO-C_6H_4-CH_2-CH-CH_3$$
$$|$$
$$Y-N-X$$

the alkylating or cyclo-alkylating agents must be so selected that they yield either X or Y or X and Y.

The process of this invention may be carried into effect by first condensing the p-hydroxybenzylmethylketone with ammonia and reducing the condensation product in any desired known manner, preferably with nascent hydrogen. The resulting base is then treated with known alkylating agents or cyclo-alkylating agents.

Thus, for example the base may be heated with diethyl sulphate. Another known alkylating method consists in heating a base with alkyl halides, for example butyl, isobutyl or isoamyl halides, for example bromides or iodides. Finally the alkylation may be effected by condensing the base with aldehydes or ketones and simultaneously reducing, for example by condensing the β-(p-hydroxyphenyl)-isopropylamine with acetone and simultaneously reducing, whereby β-(p-hydroxyphenyl)-di-isopropylamine is obtained.

In like manner in order to prepare cycloalkyl derivatives the resulting base may be treated with known cycloalkylating agents, for example by condensing with cycloaldehydes or cycloketones and simultaneously reducing.

What I claim is:

1. A process for the preparation of derivatives of β-(p-hydroxyphenyl)-isopropylamine of the formula $$HO-C_6H_4-CH_2-CH-CH_3$$
$$|$$
$$N$$
$$/ \backslash$$
$$X \quad Y$$

wherein X is a radical selected from the group consisting of lower alkyl radicals containing at least two carbon atoms and cycloalkyl radicals and Y is a radical selected from the group consisting of hydrogen, lower alkyl, and cycloalkyl radicals which consists in condensing p-hydroxybenzylmethylketone with ammonia, reducing the condensation product to form the corresponding saturated amine and contacting the resulting base with agents selected from the group consisting of lower alkylating agents and cycloalkylating agents.

2. A process according to claim 1 wherein the condensation with ammonia and the reduction of the condensation product at the nitrogen atom to form the corresponding saturated amine are effected simultaneously.

3. A process according to claim 1 wherein the condensation with ammonia and the reduction of the condensation product at the nitrogen atom to form the corresponding saturated amine are effected consecutively.

GUSTAV HILDEBRANDT.